United States Patent

[11] 3,634,588

[72] Inventors William R. Steitz
  Toledo;
  Robert O. Bradley, Ottawa Hills, both of Ohio; Thomas H. Waterworth, Bridgnorth, Salop, England
[21] Appl. No. 41,385
[22] Filed May 28, 1970
[45] Patented Jan. 11, 1972
[73] Assignees Toledo Engineering Co., Inc.
  Toledo, Ohio;
  Elemelt, Ltd.
  Kingswinford, Brierley, Staffordshire, England, part interest to each

[54] ELECTRIC GLASS FURNACE
  12 Claims, 5 Drawing Figs.
[52] U.S. Cl. .................................................. 13/6, 65/325
[51] Int. Cl. ..................................................... C03b 5/02, H05b 3/60
[50] Field of Search .......................................... 13/6, 18; 65/325, 326

[56] References Cited
  UNITED STATES PATENTS
  3,440,321 4/1969 Gell et al. ..................... 13/6

FOREIGN PATENTS
664,121 1/1952 Great Britain ................ 13/6

Primary Examiner—Bernard A. Gilheany
Assistant Examiner—R. N. Envall, Jr.
Attorney—Hugh Adam Kirk ABSTRACT: An electric glass furnace in which one or more axially movable electrodes connected to the same terminal project up through the bottom of the furnace and are mounted in special refractory blocks which form platforms above the bottom of the furnace so that electrodes for each terminal are separated by troughs. Also a separate electrode can be provided in the molten glass drawoff riser, which separate electrode may be selectively connected to an opposite terminal of an electrode adjacent the riser in the furnace, grounded, or disconnected. Furthermore, each electrode is sealed in its refractory block by an inert gas, and it and its block are cooled both by a jacket for coolant liquid around the electrode at least partly recessed in the block, and by a blast of cool air from below and against said jacket, the electrode, and the bottom of the block.

PATENTED JAN 11 1972
3,634,588
SHEET 1 OF 3

INVENTORS
WILLIAM R. STEITZ
ROBERT O. BRADLEY
THOMAS H. WATERWORTH
BY
ATTORNEY

INVENTORS
WILLIAM R. STEITZ
BY ROBERT O. BRADLEY
THOMAS H. WATERWORTH

ATTORNEY

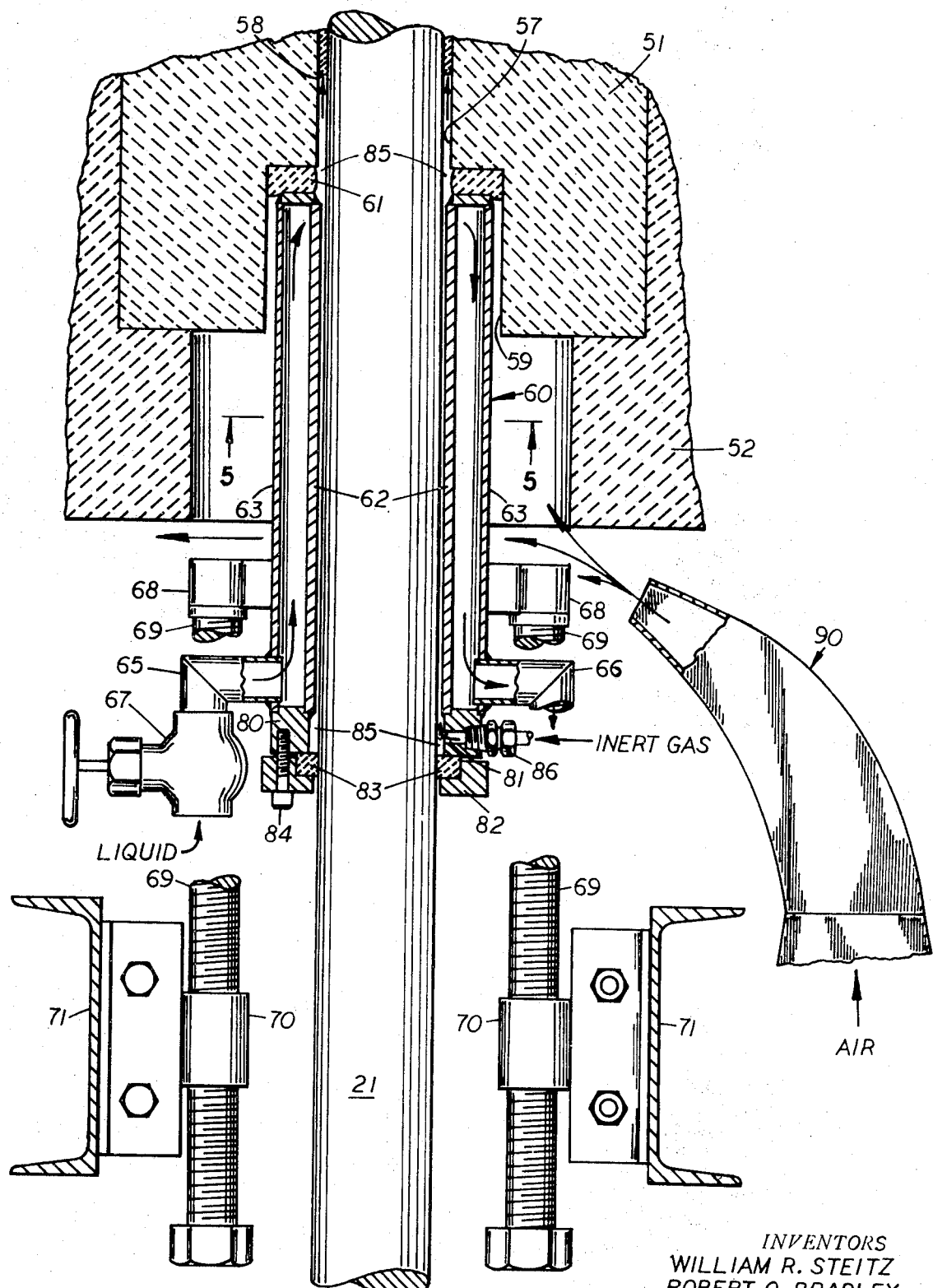

ELECTRIC GLASS FURNACE

BACKGROUND OF THE INVENTION

An example of an electric glass-resistant furnace of the type involved herein is shown in Gell et al. U.S. Pat. No. 3,440,321 issued Apr. 22, 1969, and previous method of cooling the electrodes for such a furnace is shown in Blumenfeld U.S. Pat. No. 3,391,236 issued July 2, 1968.

These furnaces are very carefully made of refractory brick so that once they are put into operation they will run for several months and preferably several years before having to be shut down. Thus it is important that as little corrosion and erosion as possible takes place during the life of the furnace.

Since these are resistance and not arc-type furnaces it is necessary first to melt the glass batch by a combustible fuel to cover the tops of all electrodes before the current in the electrodes is turned on to maintain and continue the heating by the resistance of the liquid glass between these electrodes. Then the fuel is cut off the top of the molten glass in the furnace is covered by a layer of unmelted glass batch which is periodically or continuously maintained by adding it to the top of the molten glass as it melts away. Thus the top of the molten glass is protected from the atmosphere.

SUMMARY OF THE INVENTION

Since the most heat generated in the electrical resistance of the molten glass is along the shortest path between the electrodes, it is desirable that this shortest path to be spaced as far as possible from the bottom surface of the furnace to reduce the erosion on its refractory bricks and blocks. Accordingly one of the principal features of this invention is to design the bottom of the furnace so that between opposite electrodes there are channels or troughs so that the shortest distance between electrodes is in the molten glass above the bottom of the furnace. In producing these troughs between opposite electrodes, the blocks in which the electrodes are mounted are usually made of a special type of refractory material, preferably more resistant to erosion than that of the general bricks or blocks of the bottom of the furnace, and are built up above the bottom of the furnace so that the bases of the electrodes are actually on platforms several inches above the bottom floor of the furnace. Since these blocks which made up these platforms are exposed not only on their upper surfaces adjacent the electrodes but also along the upper portions of their sides to the hot molten glass, the thermal shock which they are required to resist is materially greater. Therefore these platforms are preferably built up in steps, and the edges of their blocks are bevelled so as to reduce as much as possible the amount of surface of each block which is in contact directly with the molten glass in the furnace.

Furnaces of this type also are provided with molten glass drawoff channels in their bottoms which feed into risers connected to another chamber from which the glass is extracted for manufacture into its end product. Often times the amount of glass which is withdrawn from the furnace during its several months or years of operation, is reduced or even stopped for awhile. Under such circumstances, unless the glass is maintained in a molten state in the bottom drawoff channel and riser therefrom, it could solidify and require complete shutting down and rebuilding of the furnace. In order to prevent this a separate electrode is provided in the riser duct which is connected to the opposite terminal of one of the electrodes adjacent this channel in the furnace itself, so as to provide resistance heating of the molten glass in this channel and riser. This electrode, however, does not necessarily always have to be connected but should be available in the event that the flow of glass through the riser is not sufficient to maintain its temperature or to maintain it in a molten state. Furthermore when its flow is effective, this same riser electrode may be grounded to prevent stray currents from the furnaces electrodes leaking out into the drawoff apparatus from the chamber into which the riser is connected. Still furthermore it may be desired that neither of these functions for this riser electrode is required, so this riser electrode also should be able to be disconnected entirely from either ground or the electrical energy circuit. Thus a simple switch-type mechanism is provided so that all of these functions may be effected.

Since the electrodes for this particular type of furnace are made of sintered molybdenum metal and this metal readily oxidizes at above about 750° F., it is important that the outside ends of these electrodes be kept below this temperature so as to prevent their oxidation. Furthermore it is important that these electrodes be vertically movable and sealed in their refractory blocks by a gas which would not cause their oxidation at the point where the temperature of these electrodes gets to and above about 750° F. In this respect each of the molybdenum electrodes of the furnace are directly jacketed by an inert gas under sufficient pressure so that this gas will purge the cavity between the electrode block and the electrode. The molten glass along the electrode in the refractory block at some point forms its own seal between the electrode and the inside of the furnace.

Directly around this electrode and including this inert gas seal there is provided a cooling liquid jacket which is preferably inserted into a cavity or recess in the bottom of the refractory block through which the electrode extends. By controlling the flow of the liquid such as water through this jacket, one can cause the natural glass seal at the end of the inert gas directly around the electrode to soften so that the electrode may be vertically moved if it is desired to do so.

In addition to the liquid cooling of the electrodes in their refractory blocks which in effect also cools their refractory blocks, there has been provided special jets of air which blow against the lower ends of the refractory blocks around the electrodes and cooling jackets to further cool these parts.

Thus it is not only an object of this invention to improve the quality of the product and efficiency of an electric heat-resistant-type glass furnace, but also to reduce the thermal shock on the refractories around the electrodes, increase the life of the furnace by lengthening the heat path between the electrodes along any surface of the refractories in the bottom of the furnace, and also to allow utilization of the throat electrode in the drawoff riser from the furnace either for heating or for grounding stray currents escaping from the furnace.

BRIEF DESCRIPTION OF THE VIEWS

The above mentioned and other features, objects and advantages, and a manner of attaining them are described more specifically below by reference to embodiments of this invention shown in the accompanying drawings, wherein:

FIG. 1 is a schematic plan view of an empty resistance electrical glass furnace showing the electrodes projecting through the bottom thereof, the troughs between these electrodes, the drawoff channel for the molten glass in the bottom and part of the riser duct therefrom, together with sawtooth electrical resistance lines between opposite terminals of the electrodes as well as dotted resistance lines from the stray currents which also occur between the electrodes of other pairs of terminals;

Figures 1, 2:
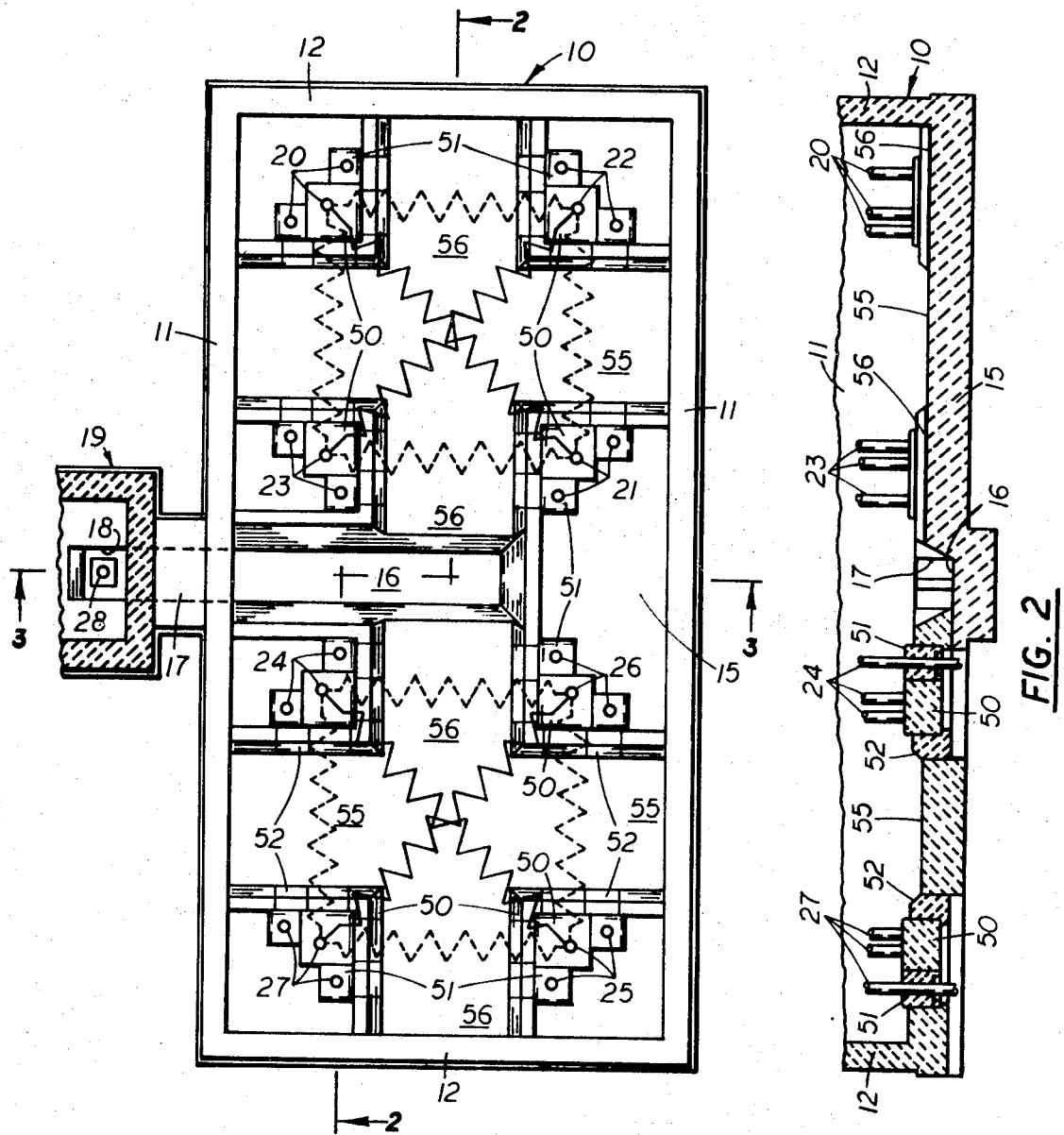
FIG. 2 is a vertical section taken along jogged line 2—2 of the bottom part of the furnace in FIG. 1 showing the refractory blocks in which the electrodes are mounted as well as the trough between them and the bottom drawoff channel.
Figure 3:
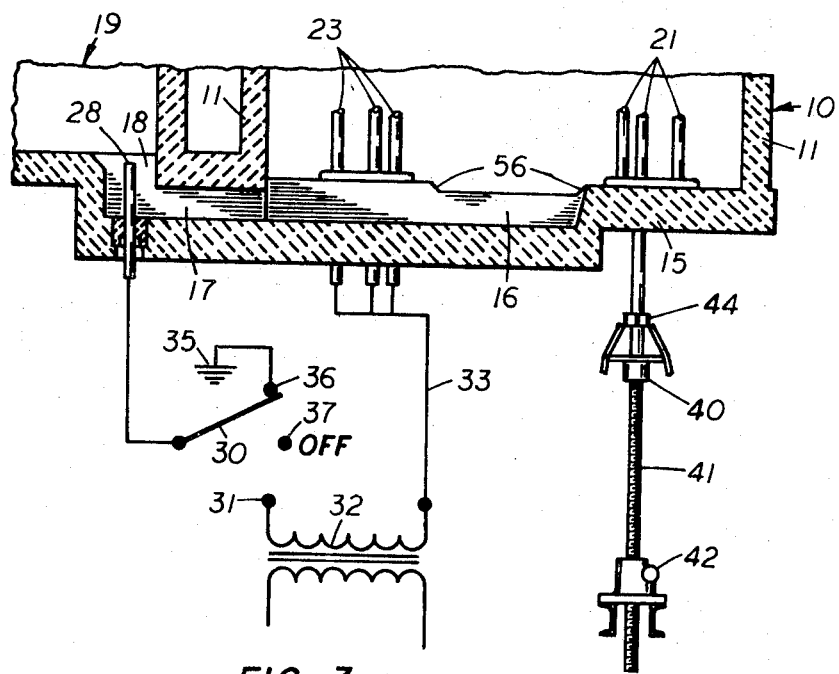
FIG. 3 is a section taken line 3—3 of FIG. 1 showing the electrode in the riser from the drawoff channel, and its electrical connections, as well as a schematic means for vertically raising and lowering one of the electrodes in the furnace.
Figure 5:
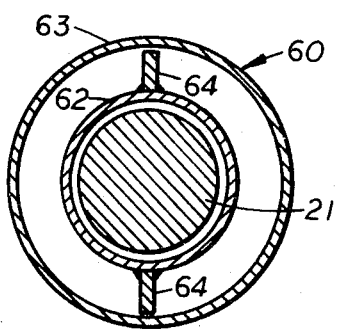

FIG. 4 is an enlarged vertical sectional view through that portion of an electrode which fits into the refractory blocks at the bottom of the furnace shown in FIGS. 1, 2 or 3, and which is sealed by an inert gas, and is cooled both by a water jacket and a jet of air as well as the supports for the jacket; and FIG. 5 is a sectional view taken along 5—5 of FIG. 4 showing the baffles in the water jacket around the electrode.

DETAILED DESCRIPTION OF THE PREFERRED EMBODIMENTS

I Furnace Tank Construction

Referring first to FIGS. 1, 2 and 3 there is shown the general outline of a rectangular glass furnace tank 10 having sidewalls and end walls 11 and 12, respectively, and bottom wall 15, all of which are made of refractory brick. Near the center of the bottom wall 15 and extending part way across it is a lower drawoff channel or trough 16 which extends beyond the sidewall 11 through a tunnel 17 into a riser 18 into a molten-glass-distributing chamber 19.

One or more clusters of similar electrodes 20 through 27 project vertically up through the bottom wall 15 into the molten glass in the tank 10, but they do not project above the molten surface of the glass therein. These electrodes 20 through 27 are relatively equally spaced with opposite terminals at the ends of the diagonals of two squares on opposite sides of the drawoff channel 16 in the bottom of the furnace. For example, the opposite terminal for the group of electrodes 20 is the terminal for the group of electrodes 21, and in the same square, electrodes 22 are opposite electrodes 23. Similarly in the other square, the group of electrodes 24 are electrically oppositely connected to electrodes 25, and 26 are oppositely connected to electrodes 27. Although three electrodes are shown connected to each of the electrical terminals in this embodiment, one or more may be employed without departing from the general scope of the invention, except that as previously stated, the connection of more than one electrode to each terminal insures continuous operation in the event one or two of the electrodes at that terminal fails during the several months or years operation of the furnace. There is also shown schematically full sawtooth resistance lines diagonally across each square from the central electrode of each group to show in what direction the most heating electrical current normally flows through the molten glass in the tank when it is in operation. Nevertheless there is also some heating current flow between the electrodes 20 and 23, 20 and 22, 22 and 21, and 21 and 23, and similarly for the other square, which currents are shown by dotted sawtooth resistance lines. Thus heat is induced into the molten glass between all of the different electrode terminals or groups of electrodes 20 through 27.

In the riser 18 there is also shown an additional electrode 28 (see also FIG. 3) which may be connected by a switch means 30 to one of its three terminals 31 connected to one end of a transformer 32 which comprises one of the Scott windings connected at its opposite end via connector 33 to the terminals of electrodes 23 adjacent the exit of the drawoff channel 16 in the tank 10. Under these conditions heating resistance also occurs between terminals 23 and 28 to maintain the glass liquid in the tunnel 17 and riser 18, in the event there was very little or no flow therethrough because no molten glass was taken off from the chamber 19. During normal operation, however, in order to prevent stray currents from leaving the tank 10, the additional electrode 28 may be connected to ground 35 via its terminal 36 as shown in full lines in FIG. 3. However, if such ground is not necessary, the switch 30 may be placed into its "Off" or no connection position at terminal 37. Thus, three different possibilities are provided for the connection of the additional electrode 28 in the riser 18.

Also in FIG. 3 there is schematically shown one of the electrodes 21 projecting below the bottom wall of the tank 10 and resting in a socket 40 at the upper end of a screw 41 which may be raised and lowered via a drive gear and motor mechanism 42. As previously stated, each one of the separate electrodes 21 through 28 are so connected to these devices 40, 41, and 42 for their vertical movement. There is also shown in FIGS. 3 and 4 for the one electrode 21 a clamp means 44 above the socket 40 by which the electrical connection is made to this electrode.

Referring back to FIGS. 1 and 2, each of the electrodes 20 through 28 is individually mounted in separate special refractory blocks 50 or 51, which blocks in turn seat in additional special refractory blocks 52, the upper faces of which blocks 50, 51, and 52 are stepped above the floor or surface of the wall 15 in the tank 10, so as to provide channels or troughs 55 and 56 which cross each other at the center of the squares of the electrodes 20 through 23 and 24 through 27, respectively. The stepped upper edges of the blocks 50, 51, and 52 may be bevelled at their corners to reduce the amount of the surface that is actually in contact with the molten glass in the tank adjacent their respective electrodes. More detail of the seating of the blocks 50 and 51 into block 52 is shown in FIG. 4. Thus, the electrodes at each terminal are raised on platforms above the bottom surface of the tank so the electrical resistance between the electrodes connected to different terminals is shorter directly through the liquid than along the bottom surface of the tank, thus reducing the amount of heat which is created on the skin layer of the molten glass against the refractories forming the surface of the tank and the blocks 51, 52, and 53. Thus, most of the heat from the electrical current goes directly into the molten glass, increasing the efficiency of the operation of the furnace, as well as increasing the life of the refractories making up its bottom, and specifically those blocks 50 and 51 supporting the electrodes in the bottom.

II ELECTRODE MOUNTING AND COOLING

Referring now specifically to FIG. 4, there is shown an enlarged portion of a molybdenum electrode, such as for example electrode 21 although it could be of any one of the other electrodes 22 through 28. This electrode portion is shown projecting through an aperture 57 in its special refractory block 51, which aperture is slightly larger in diameter than the outside diameter of the electrode 21 so that the rod electrode 21 may be vertically moved through the aperture 57, but yet the aperture is small enough so that the glass in the furnace, when it is cooled sufficiently by the cooling means around the electrode 21, will automatically seal it at 58 to the aperture 57 in the block 51. This block 51 is also provided with a larger recess or countersunk section 59 into which is inserted a tubular liquid cooled jacket 60. Between the upper end of this jacket 60 and the end of the countersunk hole 59 there may be provided a cushion gasket of highly heat-resistant material 61. However, this material does not contact the outer surface of the electrode 21 but merely seals the end of the heat exchanger 60 to the bottom of the cavity 59.

This liquid-cooled jacket 60 comprises a pair of concentric inner and outer cylinders 62 and 63 between which liquid, such as water, may be passed for cooling the electrode 21. In order to insure good circulation of this liquid between these cylinders 62 and 63, baffles 64 are provided as shown in FIG. 5, which extend diametrically opposite each other and are spaced from the upper end of the concentric cylinder 62 and 63. The lower end of the cylinder 63 is provided with diametrically opposite inlet and outlet ducts 65 and 66, respectively, the former of which may be valved by means of a valve 67, either in this duct or at another location remote therefrom, such as in the flexible hoses which connect it with the source of the liquid that is passed through this jacket 60.

Also on opposite sides of the outer cylinder 63 of the heat-exchanger jacket 60 there may be provided brackets 68 which are connected supporting screws 69 which may be threaded into sleeves 70 permanently connected to the stationary crossbeams 71 under the structure of the furnace floor. These supporting screws 69 thus also enable a sealing pressure to be placed against the gasket 61 in recess 59 by the upper end of the liquid heat-exchanger jacket 60. Below the jacket 60 there is shown an electrical connection 44 to the electrode 21, as previously described in connection with FIG. 3.

At the lower end of the jacket 60 and closing its lower end, there may be provided a ring 80 having a radial aperture 81 and an adjacent clamping ring 82 for forcing a flexible gasket 83 into sealing engagement between the rings 80 and 82 and against the outside of the electrode 21. This outer ring 82 may be urged to squeeze the gasket 83 by means of bolts 84 threaded into the ring 80, of which at least three may be provided circumferentially of the rings 80 and 82. This seal 83 thus provides an annular fluidtight compartment 85 between the outside of the cylindrical electrode 21 and the outside of the inner cylinder 62 of the jacket 60 so that through the aperture 81 and its tubular connection 86 there may be forced under pressure an inert gas to protect the electrode 21 below the glass seal 58 in the block 51 in the bottom of the furnace 10. Thus if the electrode 21 is to be moved axially and it is sealed at 58 by solidified glass, all that needs to be done is to reduce the flow of cooling liquid through the jacket 60 by valve 67 to permit it to warm sufficiently to soften the seal 58 so that the electrode 21 can be moved, and then once it is in position more coolant can be circulated again through the jacket 60 to again form the solid seal 58.

In addition to the inert gas seal 85 between the electrode 21 and the inside of the jacket 60 and refractory block 51, and the liquid coolant through the jacket 60, there is also provided a blast of air via the duct 90 which is directed up into the bottom of the blocks 51 and 52 and around the outside of the jacket 60 and electrode 21 to cool not only the outside of the jacket 60 but also the outer and lower ends of the refractory blocks 51 and 52 to reduce the changes of thermal shock. For example in one installation, as much as 500 cubic feet of air per minute is blown on each group of electrodes.

Although the different features of this invention are related, they may be used separately or in different combinations if desired without departing from the scope of this invention.

While there is described above the principles of this invention in connection with specific apparatus, it is to be clearly understood that this description is made only by way of example and not as a limitation to the scope of this invention.

We claim:
1. An electric glass furnace comprising:
  A. a melting chamber with sidewalls and a floor,
  B. a plurality of electrodes separately axially and vertically movable projecting above said floor,
  C. separate platforms for the electrodes connected to different electrical terminals, said platforms being formed of refractory blocks and forming troughs between those electrodes connected to said different terminals,
  D. means for sealing said electrodes in said blocks by an inert gas, and
  E. means for cooling each electrode and said blocks forming said platforms by both water and air.
2. An electric glass furnace according to claim 1 wherein each said platform comprises a plurality of electrodes.
3. A furnace according to claim 1 wherein each of said platforms comprises a plurality of refractory blocks forming steps from said floor to the top of said platforms.
4. A furnace according to claim 1 wherein said blocks have beveled edges toward said floor.
5. A furnace according to claim 1 wherein said means for cooling each electrode comprises a water-cooled jacket surrounding said electrode below said floor.
6. A furnace according to claim 5 wherein said means for sealing said electrode in said block also seals said water cooling means surrounding said electrode.
7. A furnace according to claim 1 wherein said means for air cooling said electrode and blocks comprises a plurality of air jets directed against said electrodes and blocks on the outside of said furnace and said water cooling means.
8. A furnace according to claim 1 including a riser duct from said floor up outside a wall of said chamber for drawing off molten glass from said chamber.
9. A furnace according to claim 8 including an electrode in said riser duct connected to a multiple terminal switch having separate connections to ground, to the power source of an electrode in said furnace, and to a disconnect position.
10. An electric glass furnace comprising:
  A. a melting chamber with sidewalls and a floor,
  B. a plurality of electrodes in said furnace projecting above said floor,
  C. a riser duct from said floor extending up outside a wall of said chamber for drawing off molten glass from said chamber, and
  D. an electrode in said riser duct connected to a multiple terminal switch having separate connections to ground, to the power source of an electrode in said furnace and to a disconnect position.
11. A furnace according to claim 10 wherein said electrodes are separately axially movable.
12. An electric glass furnace comprising:
  A. a melting chamber with sidewalls and a floor,
  B. a plurality of electrodes in said furnace separately axially and vertically movable projecting above said floor,
  C. separate platforms for the electrodes connected to different electrical terminals, said platforms being formed of refractory blocks and forming troughs between those electrodes connected to said different terminals,
  D. a riser duct from said floor extending up outside a wall of said chamber for drawing off molten glass from said chamber,
  E. an electrode in said riser duct connected to a multiple terminal switch having separate connections to ground, to the power source of an electrode in said furnace, and to a disconnect position,
  F. means for protecting said electrodes in said furnace in said blocks and said electrode in said riser duct by means of an inert gas, and
  G. means for cooling each electrode by both water and air including cooling said blocks forming said platforms.

* * * * *

UNITED STATES PATENT OFFICE
CERTIFICATE OF CORRECTION

Patent No. 3,634,588          Dated January 11, 1972

Inventor(s) W. R. Steitz, R. O. Bradley and T. H. Waterworth

It is certified that error appears in the above-identified patent and that said Letters Patent are hereby corrected as shown below:

Column 1, line 6, after "and" insert - - a - -; line 20, after "off" insert - - and - -; line 29, after "path" delete - - to - -; line 72, "furnaces" should read - - furnace - -. Column 2, line 64, after "taken" insert - - along - -. Column 4, line 61, after "68" insert - - to - -. Column 5, line 4, "fluidtight" should read - - fluid tight - -; line 5, "outside" should read - - inside --; line 24, "changes" should read - - chances - - .

Signed and sealed this 6th day of August 1974.

(SEAL)
Attest:

McCOY M. GIBSON, JR.
Attesting Officer

C. MARSHALL DANN
Commissioner of Patents